United States Patent Office 3,042,135
Patented July 3, 1962

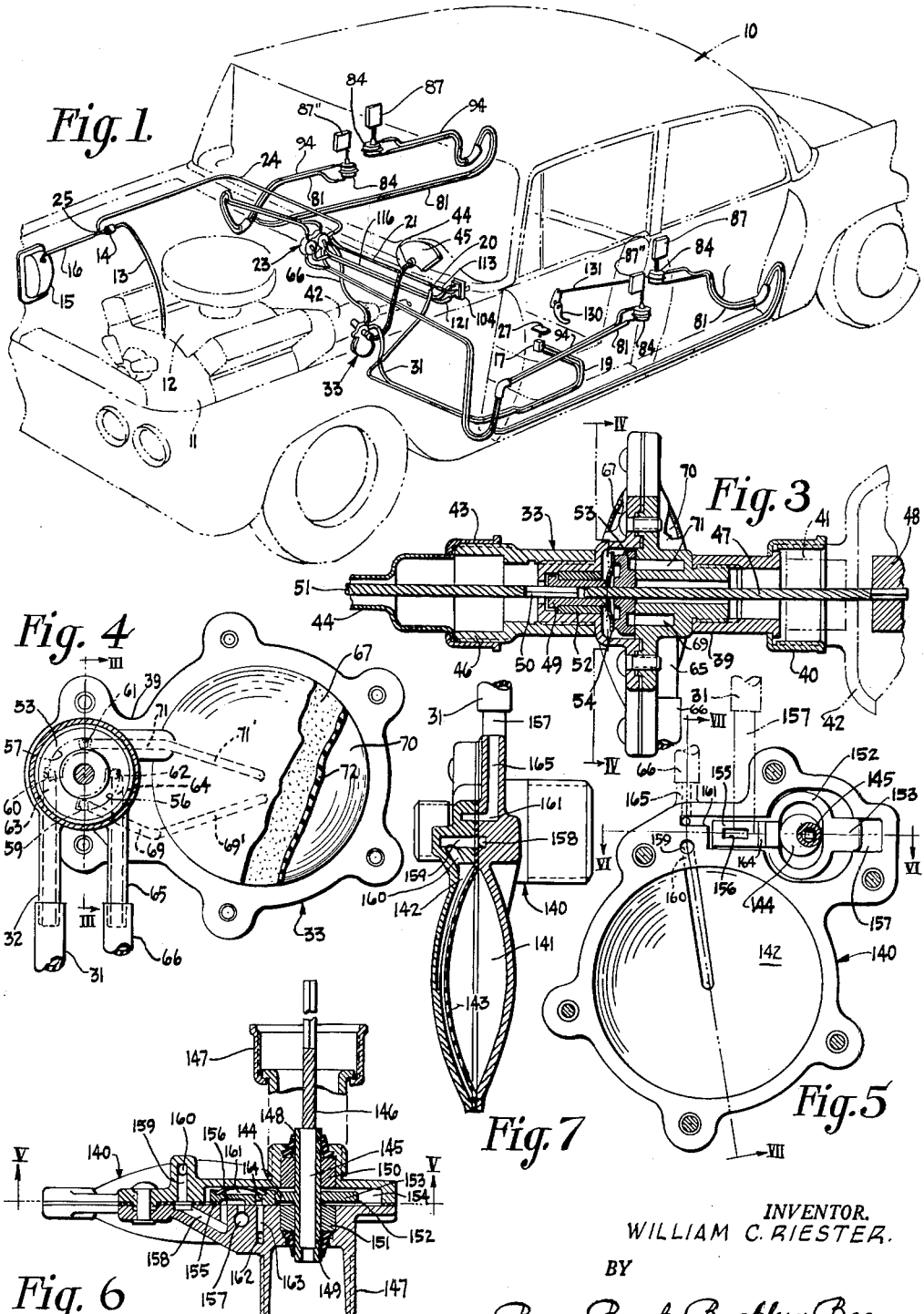

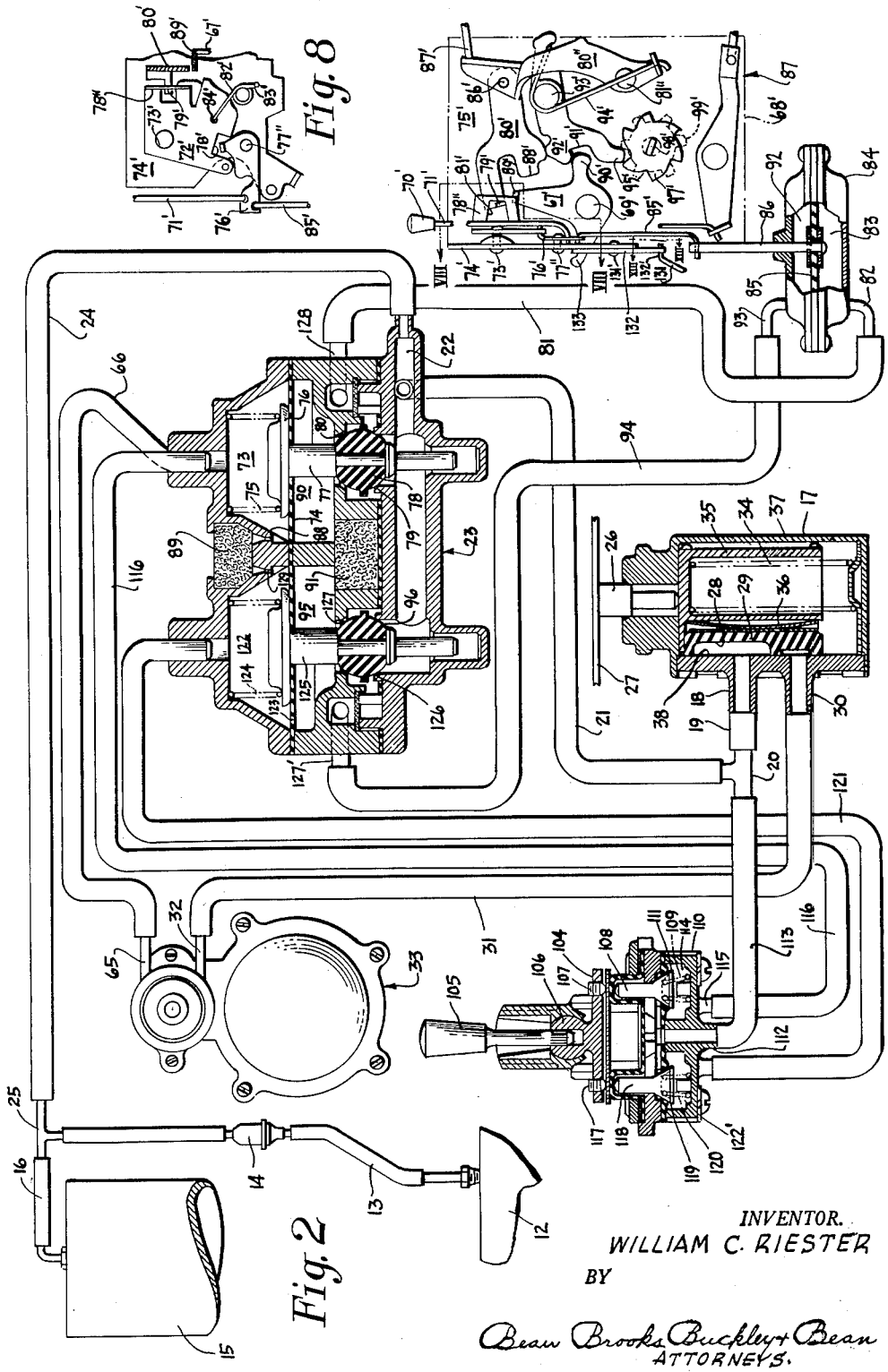

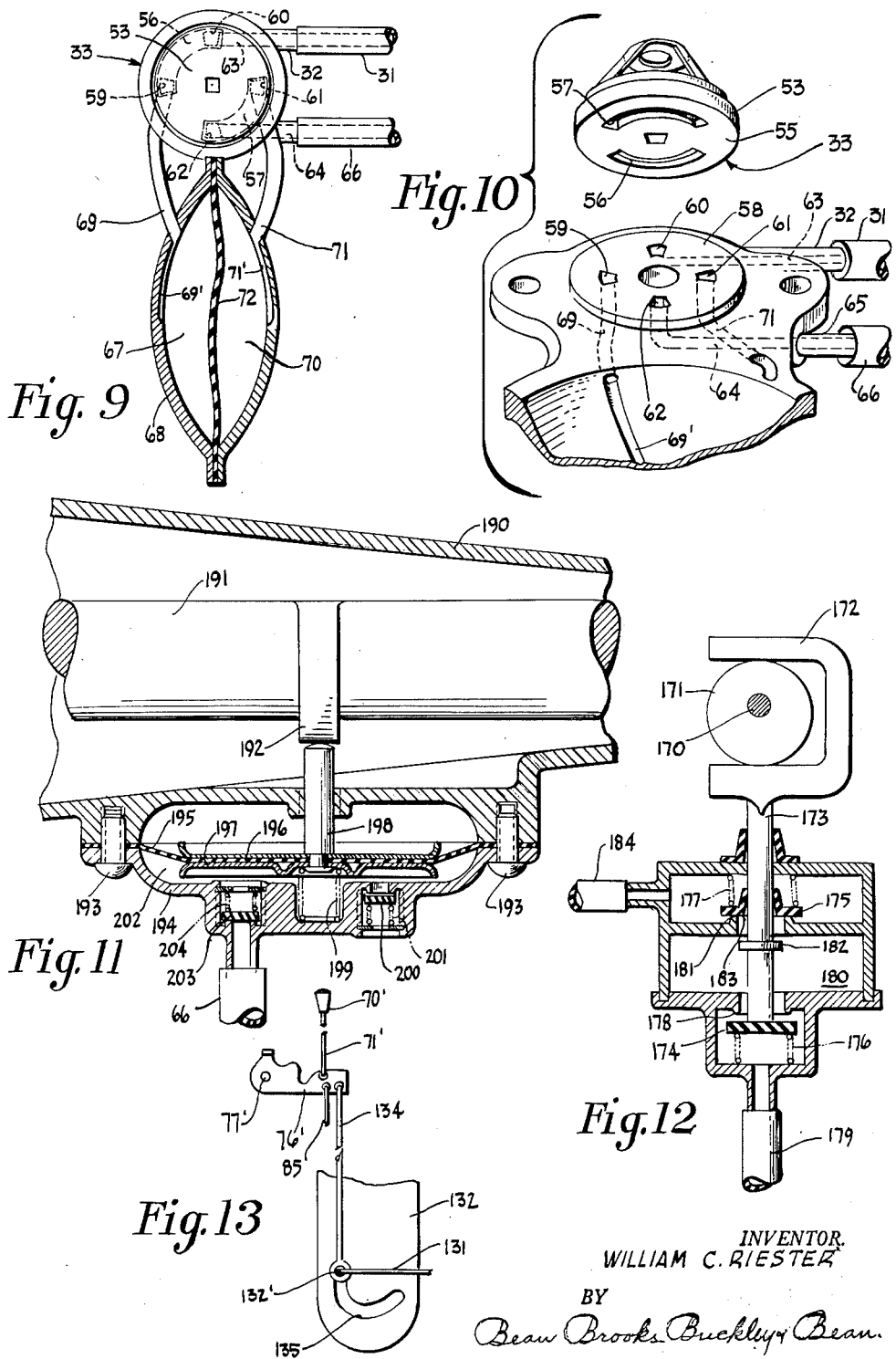

3,042,135
AUTOMATIC VEHICLE DOOR LOCKING SYSTEM
William C. Riester, Williamsville, N.Y., assignor to Trico Products Corporation, Buffalo, N.Y.
Filed Nov. 18, 1960, Ser. No. 70,320
14 Claims. (Cl. 180—82)

The present invention relates to an improved automatic door locking system for an automotive vehicle.

It is the primary object of the present invention to provide an improved door locking system for an automotive vehicle which automatically locks the vehicle doors substantially simultaneously with the initial movement of the vehicle, maintains a holding force on the rear door vehicle locks as long as the vehicle is moving to thereby prevent these doors from being accidentally opened from within the moving vehicle, and thereafter removes the door locking force from the vehicle doors substantially simultaneously with the termination of movement of the vehicle to thereby permit passengers to open the vehicle doors from within the vehicle in order to depart therefrom.

Another object of the present invention is to provide an improved automatic vehicle door locking system which not only enhances the safety of passengers against the hazards of accidental door openings from within a moving vehicle by maintaining a positive locking force on the door locks, but also causes all of the vehicle doors to be locked against unauthorized intrusion from outside of the vehicle substantially simultaneously with the first increment of movement of the vehicle, the doors thereafter being locked against unauthorized intrusion until they are subsequently unlocked from within the vehicle.

A related object of the present invention is to provide an improved motion detecting device which is capable of detecting small movements and transmitting fluid pressure impulse signals indicative of such movement.

Another object of the present invention is to provide an improved type of intelligence system for an automotive vehicle which accurately detects vehicle movement and, in response thereto, permits communication between a source of energy and a control which governs operation of an appliance in the vehicle.

A further object of the present invention is to provide a fluid pressure actuated door locking system for an automotive vehicle which is economical to produce, durable, and reliable in operation. Other objects and attendant advantages of the present invention will readily be perceived hereafter.

The automatic door locking system of the present invention enhances the safety of the vehicle occupants because it not only provides automatic locking of all of the vehicle doors against unauthorized opening from outside of the vehicle after the first increment of movement of the vehicle, but also maintains certain of the vehicle doors locked against opening by occupants within the vehicle while the vehicle is in motion to thereby prevent accidental opening of the vehicle doors, as by children in the rear of the vehicle. The present invention is especially adapted for a vehicle of the four-door body type wherein the doors have latch locks therein. The rear door latch locks of the vehicle are of the type wherein the inside door handles cannot unlatch the door locks when the locking pin or button on the rear door is in a door locking position. The front door latch locks are of the type which permit unlatching of the door locks by the inside door handle even when the push buttons or door locking pins are in a locked condition. In other words, the vehicle door latch locks are such that the inside front door handles can unlatch the front door latch locks whether they are in a locked or unlocked condition but the inside rear door handles can only unlatch the rear door latch locks if they are in an unlocked condition. The outside door handles cannot unlatch any of the locks from the outside of the vehicle when they are locked.

In accordance with the present invention, a fluid pressure door locking motor is associated with each latch lock. Substantially simultaneously with the start of movement of the vehicle, each motor is automatically placed in communication with a source of fluid pressure, in this instance a vacuum tank in communication with the engine intake manifold. The fluid pressure motors which actuate the rear door latch locks are maintained in communication with the fluid pressure source and are therefore caused to exert a holding force against the rear door lock locking buttons while the vehicle is in motion, thereby preventing children, or other occupants in the rear of the vehicle, from manipulating the locking buttons and then turning the rear door handles to open the doors. Because of the foregoing arrangement the operator is assured that children in the rear of the vehicle will not open the rear doors while the vehicle is in motion. Substantially simultaneously with the vehicle's coming to a stop the locking force exerted by the motors is automatically removed, and the rear doors may be unlatched from within the vehicle after the locking pins are moved to an unlocked position. Furthermore, because the door locking motors release their force substantially simultaneously with the termination of vehicle movement, the above-described locking arrangement used for the rear doors may also be used for at least the front seat passengers' side of the vehicle to prevent accidental door openings.

The fluid pressure circuit which causes communication between all of the door locking motors and the source of vacuum may include a first valve in communication with the source of vacuum which is opened only when the vehicle operator is sitting on the seat of the vehicle. Thus, unless the vehicle is occupied, there can be no automatic locking of the vehicle doors under any circumstances. A motion detector is provided in communication with the outlet of the seat valve. The motion detector is constructed to fit between the speedometer cable drive on the transmission and the speedometer cable itself, the latter being removed from its normal position on the transmission to permit insertion of the motion detector. It will readily be appreciated that the speedometer cable drive turns only when the vehicle is in motion and is thus used as a source of intelligence to indicate whether the vehicle is moving or at a standstill. The motion detector is in essence a fluid pressure pump which is driven by the speedometer cable drive, and this pump supplies fluid pressure impulses, in this instance vacuum, to a control valve while the vehicle is in motion, but does not supply such impulses when the vehicle is at a standstill. The control valve in turn contains a chamber having a vacuum responsive valve control mechanism which permits communication between the source of vacuum and the door locking motors when the detector pump supplies vacuum impulses thereto. The chamber to which the above-mentioned vacuum impulses are supplied, also contains a controlled bleed which vents it to the atmosphere. The detector pump supplies the vacuum impulses to the control valve at a rate so that even when the vehicle is moving very slowly the control valve is actuated to cause the door locking motors to be in communication with the vacuum source so that they will exert a locking force on the latch-locks. However, the controlled bleed is sufficiently large so that when the supplying of vacuum impulses by the detector terminates, substantially simultaneously with the stopping of the vehicle, the control valve will bleed to atmosphere almost instantaneously to thereby terminate the communication between the door locking motors and the vacuum source so that a holding force is no longer exerted on the latch locks and the doors can be unlocked from within the vehicle.

In its preferred embodiment, the motion detector is a vacuum driven vaccum pump wherein valving which is driven from the speedometer cable drive places a chamber arrangement in the pump in alternate communication with the vacuum source and the chamber of the control mechanism having the bleed therein. Because the chamber of the control valve having the bleed is not in direct communication with the source of vacuum, but in indirect communication therewith through the chamber arrangement of the detector, the vacuum source cannot bleed to atmosphere through the bleed of the control when the motion of the vehicle stops. Furthermore, because the foregoing direct communication is prevented, the control can bleed to atmosphere instantaneously with the stopping of the vehicle and thereby permit the vehicle doors to be opened from within the vehicle immediately after the vehicle stops. This aspect of the present invention will be more fully understood hereafter.

In addition to the foregoing construction which provides door locking immediately against opening from within the vehicle as well as door locking from opening outside of the vehicle, the present system also includes a manual remote locking and unlocking arrangement for the convenience of the vehicle operator. A remote control is suitably positioned within the operator's reach, as on the dashboard. The manipulation of this control will cause communication between a vacuum storage tank and the door locking motors through the control valve for the purpose of providing selective locking or unlocking of the vehicle doors. For example, if an operator enters the vehicle and desires the doors to be locked against opening from the outside before the vehicle is placed in motion, he may manipulate the control to effect locking of the vehicle doors whether or not the vehicle engine is in operation. Furthermore, if the vehicle operator desires to unlock any of the vehicle doors including the rear doors from within the vehicle to permit a passenger to enter the vehicle from outside thereof, he need merely manipulate the remote control to an unlocking position to cause the door locking motors to unlock the latch locks. In this respect it is to be noted that in an unlocking operation the action of the remote manual control supersedes the automatic locking action described above.

In addition to all the foregoing, the front and rear latch locks are of the type which will remain locked until they are manually unlocked. Thus since all of the doors are automatically locked incidental to the movement of the vehicle, only those doors which were actually used by passengers in leaving the vehicle need be relocked. If all four doors were used, the operator need merely wait until all the doors have been closed after use and then manipulate the remote control to place all the door locks in a locked condition. Thereafter the only door which requires manual locking is the door the driver used in leaving the vehicle, which door may be locked from outside of the vehicle, as with a key.

It can thus be seen that a vehicle door locking system is provided which automatically produces locking of all of the vehicle doors against intrusion from outside of the vehicle; which locks the vehicle doors substantially simultaneously with the initiation of vehicle movement and thereafter maintains the rear doors of the vehicle locked against opening from within the vehicle to safeguard children from the hazards incidental to the accidental opening of the doors of a moving vehicle, and which releases the door lock holding force on the rear door locks substantially simultaneously with the termination of vehicle movement; which provides a system of manual control which supersedes the automatic action of the system to thereby permit the vehicle operator to lock or unlock any of the vehicle doors at will; which only requires the vehicle operator to manually lock the door through which he leaves in order to provide complete locking of the vehicle when it is parked.

The present invention will be more fully understood when the following portions of the specification are read in conjunction with the accompanying drawings wherein:

FIG. 1 is a fragmentary perspective view of an automotive vehicle possessing the improved door locking system of the present invention;

FIG. 2 is a flow diagram partly in cross-section, showing the entire system of the present invention and certain salient components thereof in detail;

FIG. 3 is a cross-sectional view of one form of motion detector taken along line III—III of FIG. 4;

FIG. 4 is a plan view of the motion detector taken generally along line IV—IV of FIG. 3 with certain parts being omitted in the interest of clarity;

FIG. 5 is a plan view of an alternate embodiment of the motion detector of the present invention, the view being taken along line V—V of FIG. 6;

FIG. 6 is a cross-sectional view taken along line VI—VI of FIG. 5;

FIG. 7 is a cross-sectional view taken along line VII—VII of FIG. 5;

FIG. 8 is a detail view of the latch lock structure taken along line VIII—VIII of FIG. 2;

FIG. 9 is a schematic view of the detector of FIGS. 3 and 4;

FIG. 10 is an exploded perspective view of the valve and valve seat of the detector of FIGS. 3 and 4;

FIG. 11 is a view of an alternate form of detector which may be used in accordance with the principles of the present invention;

FIG. 12 is still a further embodiment of the motion detector of the present invention; and FIG. 13 is a view taken along line XIII—XIII of FIG. 2.

In FIG. 1 an automotive vehicle 10 is shown having an engine 11 with the usual engine intake manifold 12 which produces a vacuum whenever the vehicle engine is in operation, as is well known in the art. This vacuum is the source of energy utilized for effecting automatic locking of the vehicle doors as will become more apparent hereafter. It is of course to be understood that with suitable modifications, the present system may be used with a source of compressed air instead of vacuum or with any other suitable fluid pressure source. The vacuum source is used to effect automatic locking of the vehicle doors through a fluid pressure circuit which includes a conduit 13 having one end thereof in communication with manifold 12 (FIGS. 1 and 2) and the other end thereof coupled to check valve 14 which is in communication with vacuum tank 15 through conduit 16. Check valve 14 may be of any suitable conventional construction including a valve biased by a spring against a valve seat in such a manner that whenever the vacuum in conduit 13 leading from manifold 12 is greater than the vacuum in conduit 16, which is in communication with vacuum tank 15 and which ultimately communicates with the door locking motors, as set forth hereafter, there will be an evacuation of conduit 16 and vacuum tank 15. However, during periods of low manifold vacuum, check valve 14 will close and vacuum tank 15 will act as the source of vacuum for operation of the system. Furthermore, as is well known, check valve 14 will prevent a loss of vacuum from tank 15 to manifold 12 whenever the vacuum in tank 15 is greater than the vacuum in the manifold.

In order to prevent the vacuum source, either manifold 12 or tank 15, from communicating with the door locking motors while the vehicle is unoccupied, a seat valve 17 is provided in the seat of the vehicle operator. Valve 17 is in communication with tank 15 thorugh nipple 18 (FIG. 2), conduit 19, T-20, conduit 21, conduit 22 (in control valve 23), and conduit 24 which is attached to T-25 in communication with conduit 16 leading to tank 15. Whenever the seat of the vehicle is occupied, plunger 26 (FIG. 2) of seat valve 17 will be depressed by plate 27 on the seat to thereby cause groove 28 in slide valve 29 to bridge nipple 18 and nipple 30 to thereby permit communication between conduit 19 leading from the vacuum source, as described above, and conduit 31 in communication with nipple 32 of the motion detector 33. When the seat becomes unoccupied, spring 34 of seat valve 17 will expand and return carriage 35 to the position shown in FIG. 2 whereby slide valve 29 assumes a position which terminates communication between nipple 18 and nipple 30. A leaf spring 36 is provided within housing 37 of seat valve 17 to maintain slide valve 29 in proper engagement with valve seat 38. It can thus be seen that whenever the vehicle seat is unoccupied, the source of vacuum cannot communicate with elements of the door locking system beyond the seat valve 17.

The motion detector 33 utilizes the vehicle transmission as a source of intelligence for indicating whether the vehicle is in motion. This is necessary in the present system because when the vehicle is actually in motion a holding force is maintained on the door locks for the rear vehicle doors to prevent accidental opening thereof. The embodiment of the motion detector shown in FIGS. 3, 4, 9, and 10 includes a housing 39 having a tapped coupling member 40 rotatably mounted thereon. Coupling member 40 is adapted to be threaded onto fitting 41 forming a part of the vehicle transmission 42, fitting 41 normally being the point of attachment of fitting 43 (FIG. 3) of the speedometer cable 44 leading to the speedometer 45. It can readily be seen from FIG. 3 that in order to install motion detector 33 it is merely necessary to remove fitting 43 of the speedometer cable from transmission fitting 41, mount fitting 40 of the motion detector on fitting 41, and thereafter mount fitting 43 of the speedometer cable 44 on threaded fitting 46 of detector 33. Thus detector 33 has cable 47 therein placed in driving engagement with gear 48 of the transmission which rotates only while the vehicle is in motion. Cable 47 in turn is fixedly attached to sleeve 49 into which the non-circular portion 50 of cable 51 is adapted to be inserted whereby gear 48 drives cable 47, sleeve 49 and speedometer cable 51. Sleeve 49 is journaled in bearing 52. A rotary valve 53 (FIGS. 3, 4, 9, and 10) is rigidly secured to cable element 47 for rotation therewith. A leaf spring 54 is interposed between sleeve 49 and valve 53. Since sleeve 49, valve 53, and leaf spring 54 rotate in unison, there is no frictional wear between these three elements. Valve 53 (FIG. 10) has a face 55 having grooves 56 and 57 therein. Face 55 is adapted to seat on valve seat 58 having apertures 59, 60, 61, and 62 therein.

As noted above, conduit 31 leading from the seat valve is in communication with nipple 32 (FIGS. 2, 4, 9, and 10) of detector 33, nipple 32 in turn communicating with aperture 60 in valve seat 58 through valve conduit 63. Aperture 62 in valve seat 58 is in communication with valve conduit 64 leading to nipple 65 which is in communication with conduit 66 leading to control 23 (FIGS. 1 and 2). Furthermore, aperture 59 in valve seat 58 is in communication with chamber 67 in housing 68 through conduit 69 within the detector 33; and aperture 61 is in communication with chamber 70 in housing 68 through internal valve conduit 71. Chambers 67 and 70 are separated by flexible diaphragm 72 which is securely held between the halves of housing 68, but diaphragm 72 is sufficiently loose so that it can flop back and forth. The conduits 69 and 71 terminate in grooves 69' and 71', respectively, in the walls of chambers 67 and 70, respectively, to facilitate the separation between diaphragm 72 and the chamber walls during oscillation of the diaphragm 72, as described hereafter.

As valve 53 rotates, groove 56 will effect communication between apertures 60 and 59, while groove 57 effects communication between apertures 61 and 62. (See FIG. 9.) Thus conduit 31, which is in communication with the source of vacuum, is in communication with chamber 67 through valve conduit 63, aperture 60, groove 56, aperture 59, and valve conduit 69. Simultaneously chamber 73 (FIG. 2) of control 23 is in communication with chamber 70 of detector 33 through conduit 66 (FIG. 9), valve conduit 64, aperture 62, groove 57, aperture 61, and conduit 71. Under the foregoing conditions, diaphragm 72 (FIG. 9) will be pulled to the left because chamber 67 is evacuated. The movement of diaphragm 72 to the left will induce a vacuum impulse in chamber 73 of control 23. As valve 53 (FIGS. 9 and 10) moves a quarter turn clockwise, valve groove 56 will effect communication between apertures 60 and 61, while groove 57 effects communication between apertures 59 and 62. Thus conduit 31 in communication with the vacuum source will evacuate chamber 70 and chamber 67 will be placed in communication with chamber 73 of control 23. (See FIG. 2.) This will cause diaphragm 72 (FIG. 9) to be deflected to the right because of the evacuation of chamber 70 and the movement of the diaphragm will cause an evacuation of chamber 73 of control 23 because of the movement to the right of diaphragm 72. The movement of valve 53 another quarter turn clockwise will cause groove 56 to effect communication between apertures 61 and 62 while groove 57 effects communication between apertures 59 and 60. This will result in the evacuation of chamber 67 which is placed in communication with the vacuum source thereby causing diaphragm 72 to move to the left and inducing a vacuum impulse in chamber 70 which is in communication with chamber 73 of the control 23 as described above. Another quarter turn clockwise of valve 53 will cause it to again occupy the position shown in FIG. 9 which was described above. It can readily be seen therefore that chambers 67 and 70 of the detector are alternately evacuated by communication with the vacuum source and induce a vacuous condition in the other of the chambers 67 or 70 which is in communication with chamber 73 of control 23.

The vacuum impulses which are produced in the above described manner and transmitted to chamber 73 of control 23 occur with sufficient rapidity so that in effect the impulse are tantamount to a constant vacuum being applied to the chamber 73. The system is designed so that the slightest amount of movement of the vehicle will cause a sufficient number of vacuum impulses to be supplied to chamber 73 so that diaphragm 74 therein (FIG. 2) is moved upwardly from the position shown against the bias of spring 75. Mounted on diaphragm 74 is a dished member 76 having a stem 77 depending therefrom which mounts poppet valve 78. When poppet valve 78 is moved upwardly from its lower seat 79 to its upper seat 80, conduit 22 in control 23, which is in communication with conduit 24 leading to the vacuum tank 15, will be placed in communication with conduit 81 which in turn is in communication with nipple 82 in communication with chamber 83 of door locking motor 84. The existence of a vacuous condition in chamber 83 will cause flexible diaphragm 85 to be pulled downwardly and move motor shaft 86 attached thereto downwardly a corresponding amount. As will become apparent hereafter when diaphragm 85 is moved downwardly, a locking force will be maintained on door lock 87 as described in detail hereafter.

As indicated above, all the while the vehicle is rolling, vacuum impulses are continuously applied to chamber 73 of control 23. Chamber 73 however is vented to the atmosphere through bleed aperture 88 and filter 89. Bleed 88 is of a size which permits a vacuous condition to exist in chamber 73 while diaphragm 72 of the detector oscillates back and forth any amount. However, as soon as oscillation of diaphragm 72 ceases, as it will when the speedometer cable drive no longer rotates, vent 88 will permit chamber 73 to bleed to atmosphere and spring 75 will return stem 77 to the position shown in FIG. 2 wherein poppet valve 78 becomes seated on seat 79 to terminate communication between the door locking motor (chamber 83) and the vacuum source. After poppet valve 72 (FIG. 2) returns to the position shown, chamber 83 of motor 84 is vented to the atmosphere through nipple 82, conduit 81, chamber 90, and filter 91. It is to be especially noted that chamber 73 of control 23 is completely vented substantially simultaneously with the termination of oscillation of diaphragm 72. Therefore motor chamber 83 is vented substantially simultaneously with the cessation of the movement of the vehicle also. Thus as soon as the vehicle stops moving, the vehicle doors may be unlocked to permit egress from the vehicle, as described in greater detail hereafter. It is to be further especially noted that the size of chambers 67 and 70 of the detector are such that substantially simultaneously with the initial increment of the vehicle movement sufficient evacuation of the control chamber 73 will be effected to cause automatic locking of the vehicle doors, the evacuation of chamber 73 occurring at a rate which is greater than the entry of air into said chamber through vent 88. In other words, when detector diaphragm 72 ceases oscillation, vent 88 will cause venting of control chamber 73 immediately; however, as long as detector diaphragm 72 oscillates to any amount whatsoever, vent 88 is insufficient to cause venting of control chamber 73. It will of course be appreciated that when chamber 83 is subjected to the force of vacuum, upper chamber 92 of motor 84 is in communication with the atmosphere through nipple 93, conduit 94, the space surrounding poppet valve 96, valve chamber 95, and filter 91. While the foregoing description has referred to only one motor and the conduits associated therewith, it will readily be understood that similarly designated parts on FIG. 1 supply the same result with respect to other of the motors and it is not deemed that a detailed description of those motors and their mode of operation is necessary.

The downward deflection of diaphragm 85 of motors 84 causes the locking of latch locks 87. Locks 87 which are mounted in the rear doors have the "selective freewheeling" feature (such as shown in Patent No. 2,849,251) for preventing unlatching of the vehicle door by the inside handle when the molding button 70' is depressed. Latch lock 87 operates in the following manner: A bell crank lever 67' is pivotally mounted on housing 68' by pin 69'. The shaft 71' of a conventional manual door locking and unlocking pin 70' extends through the molding (not shown) of the vehicle door. It will of course be appreciated that certain types of vehicles have buttons on the side of the door which are pivoted between a locked and unlocked position and that the instant invention is equally applicable to such systems. Shaft 71' is fastened to one end of a bell crank lever 76' (FIGS. 2 and 8) which is adapted to pivot about pin 77", the other end of lever 76' fitting within notched recess 78' within link 72'. Link 72' is pivotally mounted on pin 73' which extends from flange 74' positioned at a right angle to plate 75' of housing 68'. As can be seen from FIG. 8, when shaft 71' is depressed, link 76' will pivot in a counterclockwise direction, and link 72' will pivot in a clockwise direction about its pivot pin 73' to cause the portion 78" of link 72' to move downwardly and carry prong 79' of link 80' (FIG. 2) downwardly with it, prong 79' fitting within the slotted portion 81' of part 78" of link 72' (FIG. 2). It will be noted that a snap spring 82' (FIG. 8) has one end 83' anchored on flange 74' and the other end 84' anchored in link 72'. Thus when manual locking pin 70' is depressed to a locked condition (either manually or by the action of motor 84), it is the snap spring 82' which maintains link 72' in a locked position.

Shaft 86 of fluid pressure motor 84 is coupled to shaft 85' (FIGS. 2 and 8) which is, in turn, coupled to bell crank lever 76'. Thus the downward movement of shaft 86 in response to the existence of vacuum in locking chamber 83 of fluid pressure motor 84 will cause a downward movement of shaft 85' which, in turn, will cause a downward movement of the leg of bell crank lever 76' to which shaft 85' is attached to thereby pivot link 72' to the position shown in FIGS. 2 and 8.

After link 80' has been pivoted in a counterclockwise direction about pin 86' in the above described manner, the movement of pin 87' to the left, as occurs when the outside door handle (not shown) is manipulated, will cause lever 80" to pivot counterclockwise about pin 81" and cause link 80' (attached to lever 80" by pin 86') to move to the left in FIG. 2. However, the end 88' of link 80' will not engage flange 89' of bell crank lever 67'. Thus the manipulation of the outside door handle will be ineffective for unlocking the door lock because the movement of link 80' will not cause lever 67' to pivot in a counterclockwise direction to free latch 99', as described in greater detail immediately hereafter.

It is only after link 80' has been pivoted about pin 86' in a clockwise direction from its position shown in FIG. 2 that the end 88' thereof may engage flange 89' when the outside door handle is manipulated. When end 88' of link 80' abuts flange 89' of bell crank lever 67' in response to the movement of pin 87' to the right during a door unlatching operation, lever 67' will pivot in a counterclockwise direction about pin 69', and the leg 90' (of lever 67') which is within the recessed portion 91' of lever 92' will cause the latter to pivot in a clockwise direction about its pivot pin 93' against the bias of spring 94'. This, in turn, will cause the tongue 95' of lever 92' to cease engagement with ratchet wheel 97' which is, in turn, coaxially mounted on shaft 98' with the rotary door latch 99'. When the above described locking arrangement for the rotary door latch 99' is released through the operation of the above described linkage, latch 99' is free to move relative to the striker plate (not shown) on the door jamb to permit the vehicle door to be pulled to an open position.

As set forth in detail above, it can readily be seen that whenever the vehicle is moving, the existence of vacuum in chamber 83 of each fluid pressure motor 84 in the rear of the vehicle will cause downward deflection of diaphragm 85 to place the door latch locks 87 in a locked condition. It is to be especially noted that since vacuum is maintained in chamber 83 at all times while the vehicle engine is in operation, a downward force is maintained on motor shaft 86 which will at all times oppose any upward force exerted on said shaft by manual manipulation of manual locking pin 70'. Therefore it can readily be seen that any attempt to unlock the latch locks from within the vehicle will be prevented by the force exerted by the door locking motor 84 whenever the vehicle is moving. Preferably this mode of operation is limited only to the rear doors to prevent passengers, such as children, from unlocking and opening the doors while the vehicle is in motion. Therefore the locks in the rear doors may be of the type disclosed in Patent No. 2,849,251 wherein the manipulation of the inside door handle will be ineffective for unlocking the door when the locking pin (such as 70') is depressed. With the rear door locks such as shown in Patent No. 2,849,251, the motors 84 may be coupled directly to the door locking pin 70' which protrude from the rear door moldings. It is to be noted, however, that latch locks 87" in the front doors of the vehicle permit the doors to be unlocked by the use of an inside door handle even if pins 70' are depressed, as described in detail hereafter. It is to be noted at this juncture that when the vehicle ceases movement after the door locks have been placed in a locked condition, as described above, all of the door locks will remain in the locked condition which will prevent the doors from being opened by the use of the outside door handles. This result is achieved because spring 82' (FIG. 8) which links flange 74' to lever 72' has an over-center type of action whereby it retains the latch lock either in a locked or unlocked condition depending upon the position to which it was last actuated. Thus after the vehicle has been parked, the only doors which need be relocked after occupants have left the vehicle are those which were actually opened by people leaving the vehicle.

The present invention also contains provisions for locking and unlocking the door latch locks 87 and 87″ from a remote position. To this end a manual control valve 104 (FIGS. 1 and 2) is provided. This valve may be mounted either on the vehicle dashboard or on the vehicle door, as desired. It will be noted that remote manual locking and unlocking of the vehicle doors takes precedence over the automatic locking action described above. When it is desired to lock the vehicle doors from a remote position, knob 105 of valve 104 is pivoted in a clockwise direction, the movement being permitted by ball joint 106. This will cause the end of adjustable set screw 107 to depress the valve stem 108 against the bias of spring 109 which is interposed between the valve housing 110 and valve 111. As can be seen from FIGS. 1 and 2, vacuum tank 15 is in communication with nipple 112 of valve 104 through conduit 16, T–25, conduit 24, valve conduit 22, conduit 21, T–20, and conduit 113. Nipple 112 in turn is in communication with chamber 114 of valve 104 when valve 111 is unseated in the foregoing manner, and chamber 114 is in communication with nipple 115 which is in communication with conduit 116 leading to chamber 73 of control 23. Thus whenever knob 105 is pivoted in a clockwise direction, chamber 73 will be evacuated through the above described circuit and cause diaphragm 74 to be lifted to cause poppet valve 78 to unseat from seat 79 and be seated on seat 80. This will permit the vacuum tank 15 to communicate with chamber 83 of motor 84 to place the door locks in a locked condition, as described in detail above. Whenever it is desired to unlock all of the vehicle doors from a remote position, it is merely necessary to pivot knob 105 of control valve 104 in a counterclockwise direction to cause the underside of adjustable set screw 117 to depress stem 118 having valve 119 mounted thereon against the bias of spring 120. This will permit communication between conduit 113, leading from the vacuum source through the circuit described above, and conduit 121 through valve chamber 122′. Conduit 121 in turn is in communication with chamber 122 of control 23. When chamber 122 is evacuated, diaphragm 123 will be lifted upwardly against the bias of spring 124 and carry valve stem 125 with it to cause poppet valve 96 mounted thereon to move from its lower seat 126 to its upper seat 127. This will permit valve conduit 22, which is in communication with tank 15, to be placed in communication with conduit 94 through nipple 127′, conduit 94 being in communication with chamber 92 of motor 84. The evacuation of chamber 92 will cause motor diaphragm 85 to deffect upwardly to place the door locks in an unlocked condition as described above. It can thus be seen that manual control 104 is provided for permitting remote locking and unlocking of the vehicle doors as desired by the vehicle operator. The path through which motor chamber 92 is vented when chamber 83 is evacuated was described above and this path is used whether locking of the vehicle doors is effected automatically or manually. However, when motor chamber 92 is evacuated to effect unlocking of the vehicle doors, chamber 83 is vented through nipple 82, conduit 81, nipple 128, the space between valve 78 and seat 80, chamber 90, filter 91, and a vent (not shown) in communication with filter 91 leading to the atmosphere. Furthermore, when knob 105 is released, if it was chamber 73 which was evacuated, the latter will vent to atmosphere through vent 88 and filter 39 to permit diaphragm 74 to return to the position shown in FIG. 2. If it was chamber 122 which was evacuated, vent 129 will cause it to vent to the atmosphere through filter 89.

As noted above, if desired all of the door locks may be of the type which have the selective freewheeling feature which prevents unlatching of the door locks if the door locking pins in the molding are in a locked condition. However, the front doors of the vehicle usually possess locks of a consruction which permits manipulation of the inside door handle 130 to override the force of the door locking motors. More specifically, as can be seen from FIG. 1, the manipulation of door handle 130 in a counterclockwise direction will cause link 131 to move to the left or move out of the plane of the drawing in FIG. 2. This will cause the upper end of link 132 which is pivoted on pin 131′ to move into the plane of the drawing. The upper end of link 132 is hooked about leg 133 of bell crank lever 67′ so that the above described movement of link 132 will cause bell crank lever 67′ to pivot in a counterclockwise direction to effect unlatching of the door notwithstanding the condition of motor 84. The selective freewheeling feature alluded to above which prevents the manipulation of the inside door handle from unlatching the door lock when the locking pin is depressed can be more readily understood from FIG. 13. In such a construction, a link 134 is connected between lever 76′ and door unlocking link 131 (FIG. 13) leading from the inside door handle. When link 76′ is depressed, as it is when the door unlocking pin in the molding 70′ is depressed, the end of link 131 will be positioned at the juncture between the horizontal and vertical portions of slot 135. Thus, movement of link 131 to the right (FIG. 13) as occurs when the door handle is manipulated, will cause the end 132′ of link 131 to ride idly in the horizontal portion of slot 135 without causing lever 132 to move. Thus, when the latch lock is in a locked condition, the movement of the door handle will be ineffective for unlatching the vehicle door. However, when pin 70′ is elevated to its unlocked position, the end 132′ of link 131 will occupy the uppermost part of the vertical portion of slot 135. Under such circumstances the movement of link 131 to the right will cause pivotal movement of lever 132 to permit the manipulation of the inside door handle to unlatch the vehicle door, as described above.

As noted above, spring 82′ causes each latch lock to remain in the position in which it was last placed either manually or by the action of the locking motors 84. Therefore it can be seen that after a vehicle has been stopped, it is only necessary to relock those doors which were actually used by persons leaving the vehicle, the other doors remaining locked because of the action of snap spring 82′. Thus if the vehicle operator is the only one in the vehicle, after he brings the car to a stop, he need only relock the door which he used in leaving the vehicle, the other doors remaining in a locked condition because of the automatic action of the door locking system.

An alternate type of motion detector which gives the same results as motion detector 33 but operates in a different manner is shown in FIGS. 5, 6, and 7. Motion detector 140 includes a housing provided with chambers 141 and 142 having diaphragm 143 as a common wall therebetween. Mounted in the housing is an ececntric 144 having a non-circular aperture therein adapted to receive the non-circular end 145 of cable 146 which is driven from the vehicle transmission in generally the same manner as the embodiment of FIGS. 3 and 4. As can be seen from FIG. 6, motion detector 140 includes a tapped sleeve 147 which fits on a fitting such as 41 (FIG. 3) adapted to normally otherwise receive the end of the speedometer cable. The end of the speedometer cable which is removed from the transmission 42 fits on the threaded portion 147 of detector 140. Eccentric 144 has sleeves 148 and 149 extending axially therefrom (FIG. 6) which are journaled in bearings 150 and 151, respectively. Therefore as the speedometer cable turns, eccentric 144 will be caused to rotate. A yoke 152 surrounds eccentric 144 and end 153 thereof is guided for reciprocation in slot 154. The other side of the yoke carries a slide valve 155 having a groove 156 therein. Actually eccentric 144 and yoke 152 constitute a Scotch yoke type of arrangement. As slide valve 155 reciprocates back and forth it will alternately effect communication between one of the chambers of the detector, either 141 or 142, with the vacuum source and cause the other of the chambers to communicate with chamber 73 (FIG. 2) of control 23. More specifically, when slide valve 155 is in the position shown in FIG. 6, groove 156 permits communication between conduit 157, which is in communication with conduit 31 leading from the seat valve 17 (FIG. 1), and chamber 142 through valve conduits 158, 159, and 160. Chamber 141 on the other hand is in communication with chamber 73 of control 23 (FIG. 2) through conduit 162, conduit 163, conduit 164 in valve 155, and the space 161 surrounding slide valve 155 which is in communication with conduit 165 to which is attached conduit 66 leading to chamber 73 of control valve 23. It will of course be appreciated that when chamber 142 is evacuated, diaphragm 143 will assume the position shown in FIG. 7 and a vacuum will accordingly be induced in chamber 141 which is in communication with chamber 73 of control 23 when slide valve 155 is in the position shown in FIG. 6. When slide valve 155 is moved to its other position, groove 156 therein will cause communication between conduit 157 and conduit 163 which leads to chamber 141. This will cause diaphragm 143 to deflect to the right and thereby induce a vacuum in chamber 142, which is then in communication with chamber 73 of control 23 through conduit 66, conduit 165, space 161 surrounding slide valve 155, and conduits 158, 159, and 160. It can thus be seen that vacuum is alternately induced in the adjacent chambers of detector 140 and the other of each of these chambers is always placed in communication with the control 23. Therefore the action produced by detector 140 is the same as the action produced by detector 33 of FIGS. 3 and 4 to provide the same relationship with control 23, which was described in detail above.

Another type of detector is schematically shown in FIG. 12 wherein speedometer cable 170 drives eccentric 171 having yoke 172 mounted thereon for reciprocation in response to rotation of cable 170. Affixed to yoke 172 is a stem 173. Valve 174 detachably abuts the end of stem 173 and valve 175 is slidably mounted at the central portion thereof. Spring 176 biases valve 174 upwardly to a closed position and spring 177 biases valve 175 downwardly to a closed position. When stem 173 is in the position shown in FIG. 12, valve 174 is unseated from its seat 178 to permit communication between conduit 179 leading from a suitable vacuum source and chamber 180. It is to be noted, however, that at this time valve 175 is firmly seated on its seat 181. However, rotation of eccentric 171 will cause stem 173 to move upwardly and spring 176 will bias valve 174 upwardly to its seat 178, thereby terminating communication between conduit 179 and chamber 180. Subsequent to such termination, shoulder 182 on stem 173 will engage the underside 183 of valve 175 and lift it from its seat 181 to permit conduit 184, which leads to chamber 73 of control 23, to communicate with previously evacuated chamber 180. It will thus be noted that chamber 180 alternately communicates with either conduit 179 or conduit 184 but will not permit direct communication between conduits 179 and 184 therethrough. The reason for this is that valves 174 and 175 cannot be opened at the same time because shoulder 182 is closer to the end of stem 173 which abuts valve 174 than the distance between valve seats 178 and 181. Thus, as eccentric 171 rotates, valves 174 and 175 will alternately open. It will of course be appreciated that the alternate communication of each of the conduits 179 and 184 with chamber 180 produces the above-enumerated advantages of preventing the vacuum source from bleeding to atmosphere when motion of stem 173 stops and also permits the chamber 73 of control 23 to be cut off from the vacuum source immediately thereby permitting it to bleed to atmosphere substantially instantaneously through bleed 88, as described in detail above, to thereby permit unlocking of the vehicle door from within the vehicle substantially simultaneously with the termination of vehicle operation.

Still a further modification of the present invention is shown in FIG. 11. More specifically, the transmission 190 has a shaft 191 therein on which is located an eccentric 192. Secured to the transmission by means of screws 193 is a housing 194. A flexible diaphragm 195 is positioned between the transmission and housing 194 and is securely held by screws 193. Mounted on flexible diaphragm 195 are dished members 196 and 197 to which is riveted stem 198 which is adapted to reciprocate back and forth under the urging of spring 199 and eccentric 192 as shaft 191 rotates. As diaphragm 195 moves downwardly, it will unseat valve 200 against the bias of spring 201 because the air within chamber 202 will tend to compress. As diaphragm 195 moves upwardly under the urging of spring 199, intake valve 203 will move upwardly against the bias of spring 204 to thereby permit evacuation of conduit 66 in communication with chamber 73 of control 23. Thereafter during the down stroke of diaphragm 195 valve 203 will seat and valve 200 will unseat to permit discharge of the air from chamber 202. Thus the modification of FIG. 11 serves as a vacuum pump to provide the necessary vacuum for controlling the control. This modification differs from the embodiments discussed above in that it does not have to be utilized with a separate source of vacuum but itself produces the vacuum necessary for operating the control 23.

While the present motion detecting system has been described with respect to an automatic door locking system for an automotive vehicle, it will of course be appreciated that the motion detecting system herein described has much broader usage in that it may be used with other types of appliances in an automotive vehicle other than the door locking system specifically set forth.

Furthermore, while the foregoing description has indicated that the detecting device causes locking of the vehicle doors with the first increments of vehicle movement, it will of course be appreciated that to modify the motion detector to effect locking and unlocking of the vehicle doors at any predetermined speed is within the contemplation of the present invention.

It can thus be seen that the present invention is manifestly capable of achieving the above-enumerated objects, and while preferred embodiments of the present invention have been disclosed, it can readily be understood that it is not limited thereto, but may otherwise be embodied within the scope of the following claims.

What is claimed is:

1. A door locking system for an automotive vehicle comprising a door in said vehicle, a latch lock for said door, motor means operatively coupled to said latch lock, a source of energy, control means for placing said motor means in communication with said source of energy to thereby cause said motor means to exert a locking force on said latch lock, biasing means associated with said control means for normally producing a force which causes said control means to prevent communication between said energy source and said motor means, a movable element on said vehicle which produces movement only when said vehicle is in motion, motion detecting means adapted to be actuated by said movable element to provide fluid pressure impulses while said movable member is moving, means for transmitting said fluid pressure impulses to said control means whereby said fluid pressure impulses actuate said control means against the force produced by said biasing means and thereby cause said control means to effect said communication between said energy source and said motor means to cause said motor means to exert a locking force on said latch lock, and a controlled bleed operatively associated with said control means for permitting said biasing means to return said control means to a condition wherein it terminates communication between said energy source and said motor means after the termination of the supplying of fluid pressure impulses to said control means by said motion detecting means, whereby said locking force exerted on said latch lock by said motor means while said vehicle is in motion ceases after said vehicle comes to rest.

2. A door locking system for an automotive vehicle comprising a door in said vehicle, a latch lock for said door, a fluid pressure motor operatively coupled to said latch lock, a source of fluid pressure, control means for placing said fluid pressure motor in communication with said fluid pressure source to thereby cause said fluid pressure motor to exert a locking force on said latch lock, biasing means associated with said control means for producing a force which tends to cause said control means to prevent communication between said fluid pressure source and said fluid pressure motor, a movable element on said vehicle which produces movement when said vehicle is in motion, motion detecting means adapted to be actuated by said movable element to provide fluid pressure impulses at a frequency proportional to the speed of said vehicle while said movable member is moving, means for transmitting said fluid pressure impulses to said control means whereby said fluid pressure impulses actuate said control means against the force produced by said biasing means and thereby cause said control means to effect said communication between said fluid pressure source and said fluid pressure motor to cause said fluid pressure motor to exert a locking force on said latch lock when said fluid pressure impulses are supplied above a predetermined frequency, and a controlled bleed operatively associated with said control for permitting said biasing means to return said control to a condition wherein it terminates communication between said fluid pressure source and said fluid pressure motor when said fluid pressure impulses supplied to said control by said motion detecting means reach said predetermined frequency, whereby said locking force exerted on said latch lock by said fluid pressure motor ceases when said vehicle reaches a speed wherein said fluid pressure impulses are reduced to said predetermined frequency.

3. In combination in an automotive vehicle, a motion detecting system for detecting the movement of said vehicle and producing a response for actuating an appliance in said vehicle comprising an energy source, an element in said vehicle which is movable when said vehicle is in motion, control means for effecting operation of said appliance, and means operatively coupled to said movable element for effectively intermittently placing said control means in communication with said energy source while said vehicle is in motion whereby said appliance will be actuated in response to movement of said vehicle, said means for effecting said intermittent communication between said control and said energy source preventing communication between said energy source and said control means when said vehicle is at rest whereby said control means becomes uninfluenced by said energy source incidental to cessation of movement of said vehicle.

4. In combination in an automotive vehicle, a motion detecting system for detecting movement of said vehicle and for producing a response for actuating an appliance in said vehicle comprising a fluid pressure source, an element in said vehicle which is movable when said vehicle is in motion, control means for effecting operation of said appliance, and valve means adapted to be actuated by movement of said element for intermittently placing said control means in communication with said fluid pressure source at a sufficient frequency to cause said control to be continuously actuated while said element is moving, said valve means terminating communication between said fluid pressure source and said control incidental to the reducing of the speed of said vehicle to a predetermined value whereby said control is no longer subjected to fluid pressure from said source and whereby said appliance is no longer actuated when said vehicle speed reaches said predetermined value.

5. A motion detecting system for detecting the movement of a movable member comprising a fluid pressure source; a control for producing a predetermined response; and a motion detecting device comprising a housing, chamber means within said housing, first conduit means for causing communication between said chamber means and said fluid pressure source, second conduit means for causing communication between said chamber means and said control, and valve means actuable when said movable member is moving for effecting intermittent communication between said chamber means and said fluid pressure source through said first conduit means and alternately effecting intermittent communication between said chamber means and said control through said second conduit means whereby said control is effectively placed in communication with said fluid pressure source whereby said fluid pressure source effects actuation of said control in response to movement of said movable member, said valve means being arranged to prevent communication between said first and second conduit means through said chamber means when said movable member is at rest whereby said control no longer produces said predetermined response after the cessation of movement of said movable member.

6. A motion detecting system for detecting movement of a movable member comprising a fluid pressure source; a control for producing a predetermined response; and a motion detecting device comprising a housing, chamber means within said housing, first conduit means for causing communication between said chamber means and said fluid pressure source, second conduit means for causing communication between said chamber means and said control, and valve means actuable when said movable member is moving for effecting intermittent communication between said chamber means and said fluid pressure source through said first conduit means and alternately effecting intermittent communication between said chamber means and said control through said second conduit means to provide fluid pressure impulses to said control at a frequency dependent on the rate of movement of said movable member whereby said control is effectively placed in communication with said fluid pressure source, and controlled bleed means operatively associated with said control tending to negate said predetermined response, said intermittent communication between said control and said fluid pressure source causing said control to produce said predetermined response when said frequency of said fluid pressure impulses is above a predetermined value notwithstanding the opposition thereto provided by said controlled bleed, said controlled bleed causing said predetermined response to be no longer produced when said frequency is reduced to said predetermined value.

7. A motion detecting device adapted to be used in conjunction with a fluid pressure source to detect the existence of motion of a movable member by producing fluid pressure impulses comprising a housing, a diaphragm dividing said housing into first and second chambers, linkage means adapted to be actuated by said movable member, valve means in said housing adapted to be actuated by said linkage means, first conduit means extending between said valve means and said fluid pressure source, said linkage means in response to motion of said movable member alternately causing said valve means to cause communication of said first and second chambers with said fluid pressure source through said first conduit means while simultaneously causing communication of the other of said chambers with an area external to said housing through second conduit means thereby causing oscillation of said diaphragm to produce fluid pressure impulses communicable between said other of said chambers and said external area through said second conduit means thereby providing a response for detecting the motion of said movable member, said alternate communication between said source of fluid pressure and said first and second chambers preventing direct communication between said fluid pressure source and said area external to said housing when said valve comes to rest at any position when motion of said member ceases whereby said external area becomes uninfluenced by the action of said fluid pressure source on said diaphragm substantially simultaneously with the cessation of movement of said movable member.

8. A motion detecting system for detecting the movement of a movable member comprising a fluid pressure source; a control for producing a predetermined response; and motion detecting means comprising a housing, a diaphragm dividing said housing into first and second chambers, mechanical linkage means adapted to be actuated by said movable member, valve means in said housing adapted to be actuated by said linkage means, first conduit means extending between said valve means and said fluid pressure source, second conduit means extending between said valve means and said control, said linkage means in response to motion of said movable member alternately causing said valve means to cause communication of said first and second chambers with said fluid pressure source through said first conduit means while also simultaneously causing communication of the other of said chambers with said control through said second conduit means thereby causing the oscillation of said diaphragm produced by alternate application of fluid pressure to said first and second chambers to produce fluid pressure impulses communicable between said other of said chambers and said control, said alternate communication between said source of fluid pressure and said first and second chambers preventing direct communication between said fluid pressure source and said control when said valve comes to rest at any position when motion of said movable member ceases whereby said control becomes uninfluenced by the force produced by said fluid pressure source substantially simultaneously with the cessation of movement of said movable member.

9. A system as set forth in claim 8 wherein said control includes a chamber in communication with said second conduit means, a second diaphragm forming a wall of said chamber, means for biasing said second diaphragm in a direction opposite to the force of the fluid pressure impulses produced by said motion detecting means, said fluid pressure impulses displacing said second diaphragm to an actuated position against the biasing force produced by said biasing means, and bleed means associated with said chamber for permitting said chamber to bleed completely when said detecting device no longer produces fluid pressure impulses to thereby permit said biasing means to return said second diaphragm to a non-actuated position, and means attached to said diaphragm and utilizing the movement thereof to produce said predetermined response.

10. A door locking system for an automotive vehicle comprising a door in said vehicle, a latch lock for said door, a vacuum motor operatively coupled to said latch lock, a vacuum source, control means for effecting communication between said vacuum motor and said vacuum source, a chamber in said control means, a movable wall associated with said chamber, valve means operatively coupled to said movable wall, biasing means for biasing said movable wall and said valve means to a position wherein communication between said vacuum source and said vacuum motor is prevented, a movable element in said vehicle which produces movement when said vehicle is in motion, motion detecting means adapted to be actuated by said movable element to provide vacuum impulses to said chamber at a sufficient frequency to move said movable wall against the bias of said biasing means and thereby cause said valve means to permit communication between said vacuum source and said vacuum motor to thereby cause said vacuum motor to exert a locking force on said latch lock, and a controlled bleed operatively associated with said chamber for venting said chamber to the atmosphere, said controlled bleed permitting said biasing means to return said valve to a position wherein it terminates communication between said vacuum source and said vacuum motor when the vacuum impulses supplied to said chamber by said motion detector reaches a certain frequency.

11. A door locking system for an automotive vehicle comprising a door in said vehicle, a latch lock for said door, a fluid pressure motor operatively coupled to said latch lock, a source of fluid pressure, control means for effecting communication between said fluid pressure motor and said fluid pressure source, a chamber in said control means, a movable wall associated with said chamber, valve means operatively coupled to said movable wall, biasing means for biasing said movable wall and said valve means to a position wherein said valve means prevent said communication between said fluid pressure motor and said fluid pressure source, a movable element in said vehicle for producing movement when said vehicle is in motion, motion detecting means adapted to be actuated by said movable element to provide fluid pressure impulses to said chamber, and a controlled bleed operatively associated with said chamber for venting said chamber, said motion detecting means and said controlled bleed being interrelated so that said movable wall will be moved against the bias of said biasing means when said fluid pressure impulses produced by said motion detecting means are above a predetermined frequency, to thereby cause said valve means to permit communication between said fluid pressure source and said fluid pressure motor whereby said fluid pressure motor will exert a locking force on said latch lock, said controlled bleed permitting said biasing means to cause said valve means to terminate said communication between said fluid pressure source and said fluid pressure motor when said motion detecting means supplies said fluid pressure impulses to said chamber at said predetermined frequency whereby said fluid pressure motor will cease exerting a locking force on said latch lock.

12. A door locking system as set forth in claim 11 wherein said predetermined frequency is zero.

13. A door locking system for an automotive vehicle comprising a door in said vehicle, a latch lock for said door, motor means operatively coupled to said latch lock, a source of energy, control means for placing said motor means in communication with said source of energy to thereby cause said motor means to exert a locking force on said latch lock, biasing means associated with said control means for normally producing a force which causes said control means to prevent communication between said energy source and said motor means, a movable element on said vehicle which produces a degree of movement which is proportional to vehicle speed, motion detecting means adapted to be actuated by said movable element to provide fluid pressure impulses at a frequency proportional to vehicle speed in response to movement of said movable member, means for transmitting said fluid pressure impulses to said control means whereby said fluid pressure impulses above a predetermined frequency actuate said control means against the force produced by said biasing means and thereby cause said control means to effect said communication between said energy source and said motor means to exert said locking force on said latch lock, and a controlled bleed operatively associated with said control means for permitting said biasing means to return said control means to a condition wherein it terminates communication between said energy source and said motor means incidental to the reducing of the fluid pressure impulses supplied to said control means by said motion detecting means to said predetermined frequency, whereby said locking force exerted on said latch lock by said motor means ceases when said vehicle reaches a predetermined speed wherein said fluid pressure impulses are reduced to said predetermined frequency.

14. A door locking system as set forth in claim 13 wherein said movable element on said vehicle comprises the speedometer cable takeoff on the vehicle transmission and wherein said motion detecting means is installed between said speedometer cable takeoff and the speedometer cable of said vehicle.

References Cited in the file of this patent

UNITED STATES PATENTS

| | | |
|---|---|---|
| 2,160,737 | Horton | May 30, 1939 |
| 2,185,909 | Caponey | Jan. 2, 1940 |
| 2,189,748 | Wilson | Feb. 6, 1940 |
| 2,198,862 | Chesler | Apr. 30, 1940 |
| 2,265,524 | Fruth | Dec. 9, 1941 |
| 2,876,856 | Greene | Mar. 10, 1959 |
| 2,941,614 | Forbush et al. | June 21, 1960 |